Dec. 12, 1944.  J. E. ROSANDER ET AL  2,364,820
BEER FAUCET
Filed Jan. 9, 1941
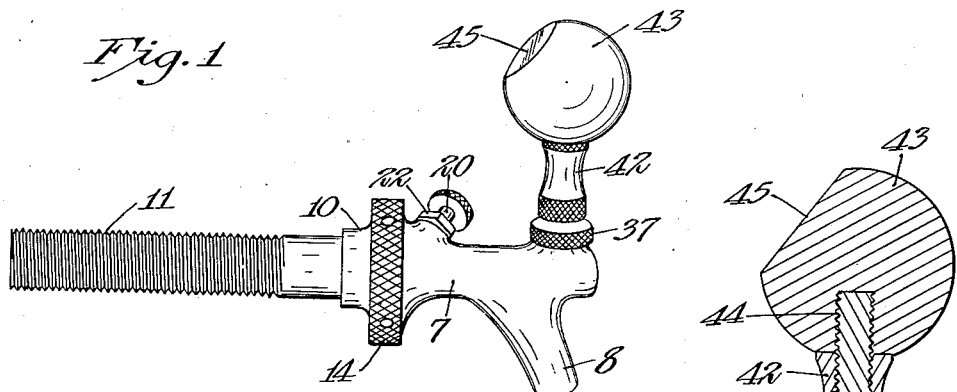
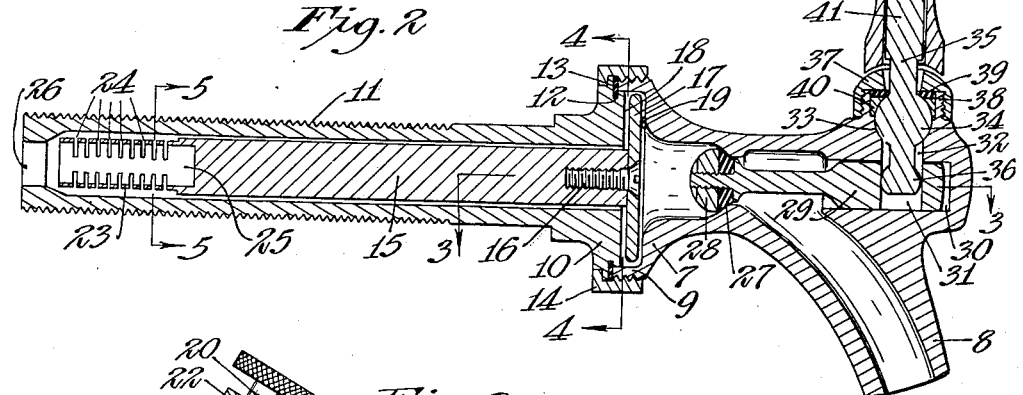
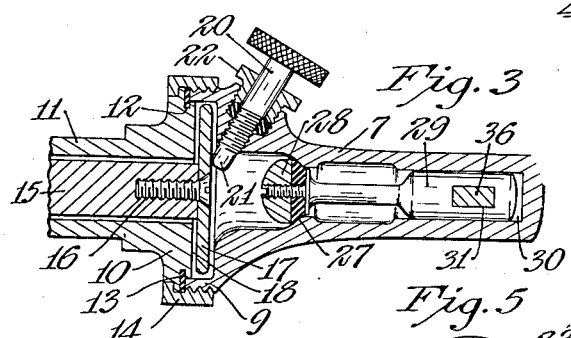
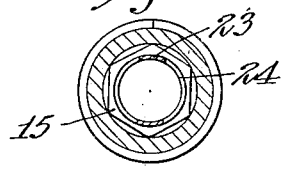
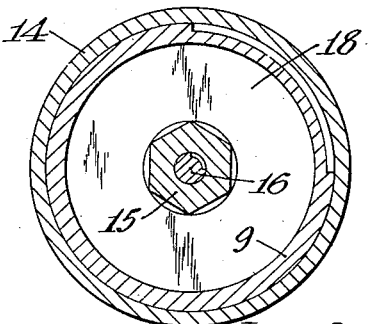
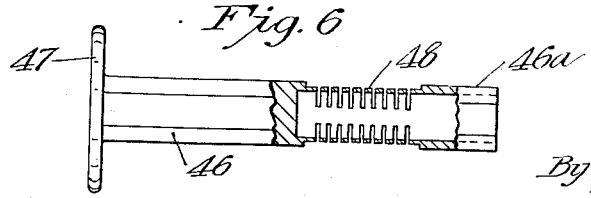
Inventors
Axel E. Rosander
John E. Rosander
By Williamson & Williamson
Attorneys Patented Dec. 12, 1944

2,364,820

UNITED STATES PATENT OFFICE 2,364,820

BEER FAUCET

John E. Rosander and Axel Edward Rosander, Minneapolis, Minn.

Application January 9, 1941, Serial No. 373,710

2 Claims. (Cl. 138—41)

This invention relates to flow control devices and more particularly to faucets for handling carbonated and other gas filled liquids such as beer.

Our invention relates to improvements in beer faucets which are used in combination with a faucet construction such as disclosed in United States Patent Number 2,225,996, granted on December 24, 1940, to Carl W. Johnson.

With the ordinary type of beer faucet there is a pressure drop from the faucet valve back through the line to the keg when the faucet valve is opened. This permits the gas to escape from the liquid and form objectionable foam throughout the line.

It has been found that when a suitable pressure gate is placed in the flow line adjacent the faucet valve it is possible to draw liquids from the faucet, but at the same time maintain sufficient pressure in the line to prevent excessive foaming. In the above identified Carl W. Johnson patent adjustable means is provided for varying the degree of restriction in the line to suit different pressure and temperature conditions.

It is a general object of our invention to provide a beer faucet which includes means for securing variable restriction of flow in combination with a device for providing a fixed flow resistance, the fixed flow resistance being a desired normal resistance under normal conditions and the variable resistance being provided to increase flow restriction under abnormal conditions.

Another object of the invention is to provide a faucet including variable flow restriction means including a pair of relatively movable elements with an improved guide for securing even spacing of said relatively movable restriction elements and a consequently better control of pressure flow.

A further object of the invention is to provide restriction means in a faucet in combination with improved filtering or straining means to prevent foreign particles, such as pitch and revenue stamp particles, from clogging the flow restriction elements of the device.

Still another object is to provide flow restriction means in combination with a faucet wherein the stream of liquid is evenly divided as it is introduced into the restriction means to further improve the flow characteristics of the device.

Still another object of the invention is to provide simple yet efficient means for varying the adjustable restriction elements.

Another object of the invention is to provide improved cut-off valve operating means.

A further object of the invention is to provide a divided faucet casing with a coupling for connecting the parts thereof and an improved gasket arrangement for preventing leakage at the coupling.

Still another object of the invention is to provide an improved mounting arrangement for the knob of the valve operating handle.

These and other objects and advantages of the invention will more fully appear from the following description made in connection with the accompanying drawing, wherein like reference characters refer to the same parts throughout the views, and, in which:

Fig. 1 is a side view taken below the eye line showing the general arrangement of our device;

Fig. 2 is an enlarged longitudinal vertical section;

Fig. 3 is a section taken approximately on the line 3—3 of Fig. 2;

Fig. 4 is an enlarged section taken approximately on the line 4—4 of Fig. 2;

Fig. 5 is an enlarged transverse section taken approximately on the line 5—5 of Fig. 2; and Fig. 6 is a side view partially in section of a modified form of guide stem for use with the adjustable restriction feature of our invention.

In the drawing there is shown a faucet casing 7 having a flow outlet spout 8. The faucet casing 7 is provided with an annular threaded rear portion 9 against which is positioned the enlarged rounded end 10 of a substantially tubular externally threaded shank 11. The enlarged end of the shank 11 carries a groove 12 having a gasket 13 therein. The gasket is held between the members 9 and 10, and these two members are clamped together by means of an internally threaded collar 14 which is adapted to pull the two members 9 and 10 together, as best shown in Fig. 2. The rear portion of the shank 11 is adapted to be suitably connected to a liquid supply line and as is well known in the art such a shank is conveniently connected to a coil box where the beer or other liquid is cooled.

Removably positioned within the tubular shank 11 is a hexagonal stem 15 whose longitudinal edge portions are adapted to closely fit the interior of said shank 11. Connected to the end of said stem 15 by means of a screw 16 is a circular plate 17 which preferably has smooth edges and smooth flat faces. The plate or disc 17 is adapted to cooperate with the flat face 18 on the enlarged end 10 of the tubular shank 11. The elongated stem 15 provides a guide for the movable disc 17 and insures uniform spacing of the disc from the flat disc-like end portion of the shank end 10. A small abutment 19 on the inner side of the faucet casing 7 adjacent the movable disc 17 prevents said disc from moving to the right as viewed in Fig. 2 to engage with the inner wall portions of the faucet casing 7 and consequently prevent flow past the disc to the faucet casing.

A screw 20 is threaded into a portion of the faucet casing 7, as best shown in Fig. 3, and is provided with a smooth rounded end portion 21 which is adapted to be engaged by the movable disc 17 when said disc is moved to the right under influence of liquid under pressure flowing to the right through the threaded shank 11 and around the hexagonal slidable stem 15. As the screw 20 is turned inwardly it will lessen the movement of the movable restriction disc 17 and, of course, as the screw is moved outwardly it will permit greater movement of said disc 17. A packing gland 22 prevents leakage of liquid around the screw 20.

As illustrated in Figs. 2 and 5, the left-hand or inner end of the slidable stem 15 is made circular and of less diameter than the remainder of the stem 15, and said end portion constitutes a screen 23 having a plurality of slots 24 formed therein. The screen 23 is tubular and open at its left-hand end, as viewed in Fig. 2. There is a sump or pocket 25 formed in the stem 15 at the right-hand end of the screen to catch and retain foreign particles which are prevented from flowing through the shank 11 by said screen 23. Liquid, of course, flows into the shank through an inlet opening 26 and thence through the screen 23.

The valve casing 7 is provided with a substantially frusto-conical seat 27 which is adapted to cooperate with a slidable packed valve head 28 of any suitable type. The valve head 28 is connected with a stem 29 slidably positioned in a horizontal bore 30 in the forward portion of the faucet casing 7. The stem 29 has an opening 31 formed therein which, as best indicated in Fig. 3, is generally rectangular in cross section. The faucet casing 7 is provided with a vertical opening 32 and includes a seat portion 33 to receive a ball 34 formed on a faucet valve operating handle 35. The lower end of the handle embodies a cam member 36 adapted to lie in the cut-out 31 in the valve stem 29. A threaded cap 37 is threadedly engaged with a portion 38 on the faucet casing 7 around the opening 32, and the cap 37 is adapted to press a sealing gasket 39 and ball retainer 40 down upon the ball portion 34 of the valve handle 35. This not only retains the ball in position and prevents leakage upwardly along the handle, but also affords resilient tensioning means for the ball and socket mounting of the handle 35.

It should be noted that the valve stem 29 is loosely fitted in the bore 30 and the space between the bore and the valve stem is considerably more than the space necessary to provide for ordinary sliding of one element with respect to the other. It has been found that where elements are relatively closely fitted in beer equipment the beer will collect between the parts and clog them with a hard deposit to such an extent that it will not work if the equipment is not used for a period of time and frequently this will happen over night. This deposit is called "beer stone" in the industry. However, with a construction such as that shown in the drawing the stem 29 fits so loosely that beer or other beverages which are likely to come up under the conditions stated will wash freely in and out of the bore and around the stem and keep it clean and prevent the formation and/or collection of beer solids around the stem. When the faucet valve is opened the valve and stem will, of course, drop downwardly at the valve end due to the loose fit and for that reason the valve seat 27 is tapered and presents a somewhat frusto-conical shape so that when the valve is again closed the head 28 will ride upwardly on the slanted surfaces of the seat 27 and the valve will be properly seated.

The upper portion of the handle 35 is externally threaded, as shown in Fig. 2, and at the bottom of the threaded portion of said handle 35 is an enlarged portion 41. A sleeve 42 is threaded upon the threaded portion of the handle 35 and is limited in its downward movement on the handle 35 by the enlarged portion 41. A ball 43 having a threaded socket 44 is threaded upon the upper end of the valve handle 35 and said ball is provided with a flattened portion 45 which customarily carries the name of a brewer or a brand of beer. It is desirable that the flattened portion 45 face in the manner shown in Figs. 1 and 2, and in order to exactly position said ball in the manner desired the ball can be set and the sleeve 42 turned upwardly into abutment with the ball, as best shown in Fig. 2, to lock said ball 43 in its desired position.

With our improved faucet installed in a liquid dispensing system, such as a beer dispensing unit, the liquid will flow upwardly into the threaded shank 11, through its inlet opening 26 and thence through the filter or strainer 23. Liquid flowing outwardly through the strainer then flows through the spaces between the flat sides of the hexagonal stem 15 and the inner wall of the cylindrical shank 11 until it reaches the right-hand end of said shank 11. At this point the liquid flows between the movable restriction disc 17 and the disc-like face 18 on the right-hand end of the shank 11. In its passage through the shank 11 the flow is restricted due to the reduced flow area resulting from the insertion of the hexagonal stem 15 in the shank. There is sufficient restriction between the stem 15 and shank 11 to maintain pressure in the line back to the keg and consequently even when the faucet valve 28 is opened there will be no appreciable pressure drop in back of the faucet assembly or between said faucet assembly and the beer keg. However, under unusual conditions it might be necessary to turn the screw 20 inwardly and force the adjustable restriction disc 17 closer to the restriction face 18 to increase the restriction provided by the shank 11 and stem 15. As liquid issues from the right-hand end of the shank 11 to the space between the disc 17 and the disc-like end 18 of said shank 11 it is divided into a number of equal parts as it issues from the end of the shank. This provides for even better control of the flow as it passes through the adjustable restriction unit.

As liquid flows around the adjustable disc 17 it flows into the faucet casing 7 to the faucet cut-off valve 28. If the valve is open it will, of course, let the flow out of the outlet spout 8 and into a glass or other container to be filled. It should be particularly noted that after the liquid has passed through the restricted portion of the apparatus to the faucet casing 7 it enters a low pressure area which is in free communication with the atmosphere. We have provided unobstructed flow for the beverage from the restriction point to the outlet 8 past the rounded and relatively smooth surfaced cut-off valve 28.

In Fig. 6 there is shown a hexagonal stem 46 having an adjustable restriction disc 47 mounted on its end similarly to the stem 15 and disc 17 above described. However, in this case it will be seen that the stem 46 is considerably shorter than the stem 15, a construction required in some types of installation. The stem 46 is provided at an intermediate portion with a strainer member 48 and at the right-hand or inner end of the stem 46 is provided a hexagonal longitudinally bored guide portion 46a. A stem of this structure provides fixed and variable restriction as does the other stem as well as the strainer feature. The guide portion 46a on this shorter stem permits proper action of the movable restriction disc 47 even though the length of the stem is considerably less than in the first described structure.

From the foregoing description it will be seen that we have provided a dispensing faucet particularly valuable for use with carbonated or other gas treated liquids wherein a pressure gate or restriction unit is utilized to prevent appreciable pressure drops throughout a liquid supply line when the faucet cut-off valve is opened. Pressure control is maintained to the faucet outlet or approximately thereto and the short distance of travel of the fluid beyond the controlled pressure point is so little that the gas in the liquid does not have time to foam to such an extent as to be objectionable. We provide for a constant restriction of flow and maintenance of pressure as well as a variable control. The fixed restriction is one which is set under usual conditions and no manipulation of apparatus is required. However, when unusual conditions are present the variable restriction feature in combination with the fixed restriction provides a highly advantageous type of flow control structure.

It will, of course, be understood that various changes may be made in the form, details, arrangement and proportions of the various parts without departing from the scope of our invention.

What is claimed is:

1. Flow control means for use with a faucet having a cut-off valve comprising, a conduit adapted for connection with a source of liquid under pressure, a relatviely stationary flow restriction member associated with said conduit, a relatively movable flow restriction member positioned in opposed relation to said relatively stationary restriction member, a guide stem in said conduit and supporting said relatively movable restriction member, said guide stem being of a cross sectional size, to materially and fixedly reduce the flow capacity of said conduit at at least one point therein, the flow approach end of said stem having a longitudinal bore therein, a strainer element incorporated in said stem intermediate the ends thereof and in flow communication with the bore in said stem, and said strainer being located on the flow approach side of said restriction members.

2. Flow control means for use with a faucet having a cut-off valve comprising, a conduit adapted for connection with a source of liquid under pressure, a relatively stationary flow restriction member in said conduit, a relatively movable flow restriction member in said conduit in opposed relation to said stationary restriction member, and a guide stem in said conduit and supporting said relatively movable restriction member, said guide stem having longitudinal extending outer portions lying within a circle approximating the inner diameter of said conduit, and said stem having portion between said longitudinally extending portions which are spaced radially inwardly from the inner walls of said conduit.

JOHN E. ROSANDER.
AXEL EDWARD ROSANDER.